3,250,125
HOT METAL TEMPERATURE MEASURING DEVICE AND TEMPERATURE MEASURING METHOD
Leonard Bonn, 6515 N. 10th St., Philadelphia 24, Pa.
Filed Apr. 6, 1961, Ser. No. 101,219
3 Claims. (Cl. 73—343)

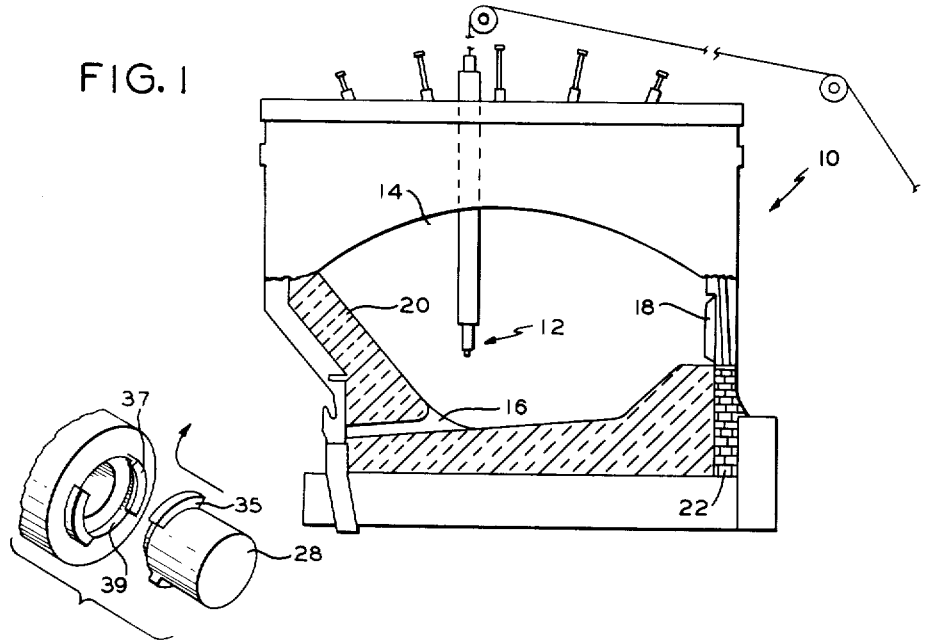
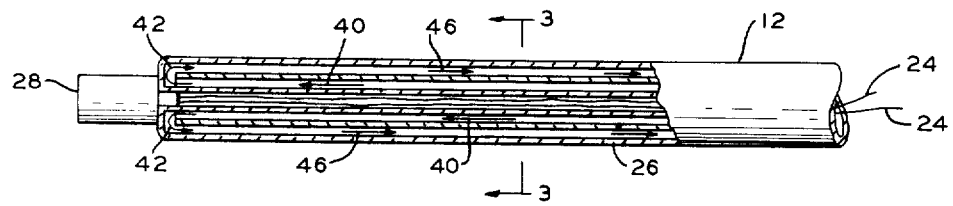
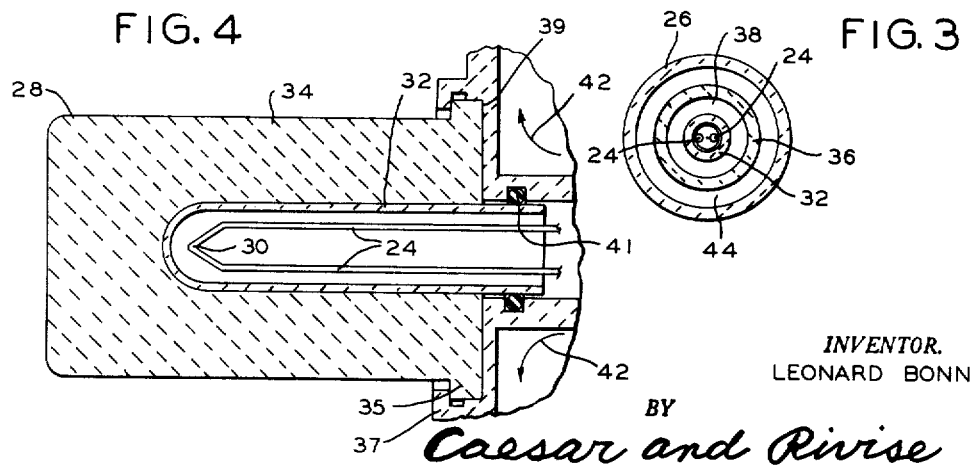
INVENTOR.
LEONARD BONN

This invention relates to a hot metal temperature measuring device which is capable of temperature measurement under conditions which heretofore have precluded a continuous measurement thereof.

The production of steel and other metals involves processes carried out at very high temperatures. The temperatures encountered are often in the range of 1000° C. to 2000° C. and higher. While it is well known how to measure temperature in this range, the corrosive nature of the metallurgical processes create extremely troublesome conditions which, to date, have prevented the measurement of the temperature on a continuous basis. The slags required for metallurgical considerations are corrosive and they dissolve and erode the protective mechanisms normally used in conjunction with temperature measuring devices. The metallurgical slags tend to accumulate at the top of the molten metal bath although, because of the extreme agitation encountered, there is no well defined interface between the metal and slag.

It is accordingly an object of the present invention to provide a hot metal temperature measuring device which resists the corrosive nature of the molten metal processing area and which can deliver a continuous, accurate temperature measurement.

Under present practices, temperature measurement of molten metal baths in the iron and steel industry is essentially an art involving an intermittent measurement and its accuracy is dependent upon the technique, skill and objectives of the particular operator. It should be noted that a knowledge of the temperature is absolutely essential in the steel industry since the properties of the finished steel and the length of time required for its processing is a function of the temperature of the process. Therefore, it is very desirable that the temperature of the molten steel bath be known continuously so that the proper additions to the melt may be made at desired temperature and time, thereby to eliminate a considerable amount of judgment from the steel making process and to convert it from an art to a science. In this manner, a step will be taken toward the complete automation of the steel making process.

The foregoing, as well as other objects of the invention, are achieved by providing a thermocouple, radiation source, or other measuring element which includes a protective shield which will prevent the destruction of the measuring means when positioned in the molten metal bath or passing through the corrosive flame and gasses above the hot metal bath and also when passing through the layer of corrosive slag which floats on top of the molten metal.

The foregoing, as well as other objects of the invention, are achieved by providing a means for the protection of the measuring means where the measuring means is a thermocouple, resistance type temperature detector or a thermal radiation target when the measuring means is a radiation device. The protective shield structure is mounted in combination with a handle or transport mechanism to permit it to be quickly thrust into the molten steel bath. A distinct object of this invention is to provide a means of transporting the aforedescribed thermocouple resistance element or radiation source through the highly corrosive zones of gasses and slags and to protect the thermocouple or radiation source during the entire temperature measuring cycle. With the present invention, the measuring element produces temperature data for hours rather than for seconds as in current practice. The handle or transport mechanism includes a cooling means to chill the slag coming in contact with it to an extent to cause the slag to freeze thereabout and thereby to function as a protective insulant rather than as a destructive force.

Other objects and many of the attendant advantages of the present invention will become better known as the same is described in greater detail hereinafter in the attached specification and drawings wherein:

FIG. 1 is a cross-sectional view of a well-known open hearth furnace showing the present invention projecting through the roof thereof and suspended in precise position by a pulley arrangement;

FIG. 2 is a perspective view partly in section of an embodiment of the present invention;

FIG. 3 is an enlarged sectional view taken along the lines 3—3 of FIG. 2;

FIG. 4 is a fragmentary, greatly enlarged longitudinal sectional view of the temperature-sensitive portion of the measuring device of FIG. 2; and FIG. 5 is an enlarged fragmentary perspective view showing a detail of the locking arrangement of FIG. 4.

Referring now to the various figures of the drawing wherein like parts carry the same reference numerals throughout, there is shown at 10 in FIG. 1 a conventional open hearth furnace with the present invention indicated at 12 as passing through the roof thereof. Furnace 10 basically comprises a steel melting area 14 with a drain off tap 16, vertically sliding door 18 and insulation 20 and 22.

The subject temperature measuring device 12 may be passed through a hole in the door, through the roof as indicated, or may be mounted through holes in the back wall, side wall or front wall. As shown in FIGS. 2, 3 and 4, the present devce basically comprises a multiplicity of hollow tubes with adequate physical strength to act as a handle or a transport mechanism 26. Said handle terminates adjacent to the temperature responsive head 28. As is best shown in FIG. 4, the temperature responsive head comprises two layers of distinctive material which combine to protect the temperature sensitive end of the thermocouple 24, or, to act as the target tube for a radiation sensing device. As shown in FIG. 4, where a thermocouple is used for illustration, the measuring junction thereof is positioned within a tube or layer 32 which extends backward into the cooled transport mechanism 26.

Tube 32 is a high temperature, impervious ceramic tube of aluminum oxide ($Al_2O_3$), beryllium oxide ($Be_2O_3$), or other high melting point refractory material. Tube 32 is denominated as the secondary protection tube and the reason for its presence will be discussed hereinafter.

Secured to the front or sensitive end and completely covering the outside surface of tube 32 is a tube denominated as the primary protection tube 34 which is highly resistant to molten metal and will also resist slag. Tube 34 is composed of a mixture of clay and graphite and other elements which act primarily as binders wherein the proportions of each constituent may vary considerably. It has been found empirically that the most satisfactory proportions are about 30% clay and 70% graphite. Too high a percentage of clay would have a deletrious effect on the high temperature strength of the material and too low a percentage of clay would retard the self vitrification tendencies of the clay-graphite mixture which contribute to its resistivity to the corrosive condition to which it is exposed in application. The clay-graphite mixture when formed into the required shape and used as a primary protection tube in the subject device becomes vitrified on its surface because of the presence of clay, thereby to form a heat and corrosion resistant glaze which prevents absorbtion of the graphite into the metal.

However, the clay-graphite material which constitutes the primary protection tube 34 gives off gasses and fumes which attack the thermocouple and render it unusable for its intended purpose. These same gasses act as a filter to radiation and prevent the use of radiation detection equipment for temperature measurement. Hence, the inner, impervious tube 32 is employed to insure that the deleterious gasses given off by the primary protection tube 34 do not enter the area occupied by the thermocouple or into the hollow inner tube of the transport mechanism or handle.

It should be pointed out that the inner, impervious ceramic tube 32 is impervious to the corrosive gasses of the steel making process as well as the corrosive gasses of the clay-graphite protection tube. However, the ceramic tube 32 is relatively fragile and cannot alone withstand the violent reactions of the metallurgical processes.

Handle 26, as shown in FIGS. 2 and 3 is constructed of three concentric metal tubes. The central tube serves as the conduit for the passage of the sensing element wires or as the sighting tube for an optical system. The two annular spaces 38 and 44 between the inner tube intermediate and the outer tube serve as a path for the flow of a cooling medium such as water. The rate of flow of the cooling medium is great enough to prevent the outer tube 26 from melting from the heat of the metal-slag bath. The outer tube 26 should be made of a material with a high thermal conductance so that concentrations of high thermal energy will dissipate themselves along the tube and inward to the cooling medium. It should be noted that tube 26 comes in contact with hot furnace gasses and slags and metal. It relies on being maintained at a relatively low temperature by the coolant in order not to be melted away and/or corroded and, accordingly, the flow of coolant through the annular rings must be great enough to insure this. The coolant maintains the handle at a sufficiently low temperature so that slag contacting it will freeze. In this way the handle is provided with cooling means along the length of the device. The cooling means normally extend through the slag and into the hot metal bath. The cooling means are thus effective to freeze the slag adjacent the handle in order to produce a protective solid insultant against the corrosive action of the molten slag.

As indicated by the arrows in FIGS. 2 and 4, the coolant is pumped into handle 12 from a source (not shown). The coolant flows into one of the annular passageways 38 or 44 in the transport mechanism 26, or handle, and out of the other annular passageway 44 or 38 for disposal or cooling for reuse. The inlet and outlet water streams may be connected to the handle 12 by any suitable means such as flexible hoses or pipes.

It is thus seen that the measuring device 12 may be inserted by the pulley arrangement of FIG. 1 directly through the corrosive gasses and the corrosive slag into the molten metal bath to any desired depth. The device 12 may remain in such a position to provide continuous, accurate and reliable temperature readings of the metal temperature, at the desired position, at all times. The chilling action of the coolant flowing in the annular openings 38 and 44 causes the slag coming in contact with outer tube 26 to freeze to a solid. Thus, the heretofore corrosive slag actually functions as a protective insulant.

Hence, the operation of an open hearth can proceed on a definite basis in regard to the full temperature history experienced during the melt. The current multitude of inaccurate, expensive, time-consuming measurements are eliminated. Eventually, as empirical data about open hearth batch temperature history is evolved by use of this device, it will be possible to automate considerable portions, if not all, of the open hearth process.

The subject invention, in whole or in part, can find applications in other metal processes. For example, it can be used in blast furnaces, cupolas, Bessemer converters, electric reduction furnaces, etc.

Another thermocouple arrangement useable in connection with the present invention comprises providing central tube 32 in the form of a metal tube (coated with ceramic material where necessary). The necessary thermocouple wires are positioned in the tube 32 which is filled with a powdered or crushed solid insultant.

It is to be noted, as shown in FIG. 5, that tube 34 may terminate in a flange 35 interfitting in complementary recess 39 of a rearward flange. A locking ring 37 secures the flange 35 in place. In this arrangement, the tube 34 is removable to be replaced by a new tube where necessary. In addition, an O-ring or gasket 41 may be positioned behind flange 35 as shown in FIG. 4 to prevent harmful gases flowing rearwardly from tube 34 from reaching the thermocouple beyond the termination of inner layer 32.

Obviously, many modifications and variations of the present invention are possible in light of the above teachings. It is, therefore, to be understood that within the scope of the appended claims, the invention may be practiced otherwise than as specifically described.

What is claimed as the invention is:

1. A hot metal temperature measuring device for positioning in a very hot metal bath having an upper layer of slag and other corrosive substances adjacent thereto comprising in combination continuous temperature detectings means including leads and a temperature detector element, and a handle therefor, said temperature detector element being covered with protective means and said handle including cooling means which are provided along the length of said device and which normally extend through said slag and into said hot metal bath, said cooling means being effective to freeze the slag adjacent the handle to a solid insultant to protect said leads when said device is positioned in said bath.

2. The invention of claim 1 wherein said cooling means extend for substantially the entire length of said handle, with said temperature element indicating the temperature of said metal bath.

3. A method of continuously measuring the temperature of a very hot metal bath having an upper layer of slag and other corrosive substances adjacent thereto, comprising inserting through said slag layer and into said bath a temperature detector element with leads extending therefrom and through and beyond said slag layer, cooling the area adjacent said leads to a temperature below the freezing point of said slag for a sufficient time so as to accumulate a sufficient layer of frozen slag to act as a protective layer and thereafter function as an insultant rather than a destructive force.

References Cited by the Examiner

UNITED STATES PATENTS

| 1,318,516 | 10/1919 | Wallis | 136—4.6 |
| 1,979,085 | 10/1934 | Vollruth | 73—359 |
| 2,139,504 | 12/1938 | King | 73—359 |
| 2,303,704 | 12/1942 | Oseland | 73—343 |
| 2,444,410 | 6/1948 | Keinath | 73—362 |
| 2,465,322 | 3/1949 | Considine | 136—4.6 |
| 2,519,941 | 8/1950 | Tama | 73—359 |
| 2,785,216 | 3/1957 | Winner | 73—359 |
| 2,999,121 | 9/1961 | Mead | 73—359 |
| 3,045,487 | 7/1962 | Raezer | 73—359 |

FOREIGN PATENTS

| 6,364 | 6/1912 | Great Britain. |
| 7,910 | 6/1908 | Great Britain. |
| 191,712 | 7/1923 | Great Britain. |

LOUIS R. PRINCE, *Primary Examiner.*

ISAAC LISANN, R. F. BEERS, S. H. BAZERMAN,
*Assistant Examiners.*